Figure 1:
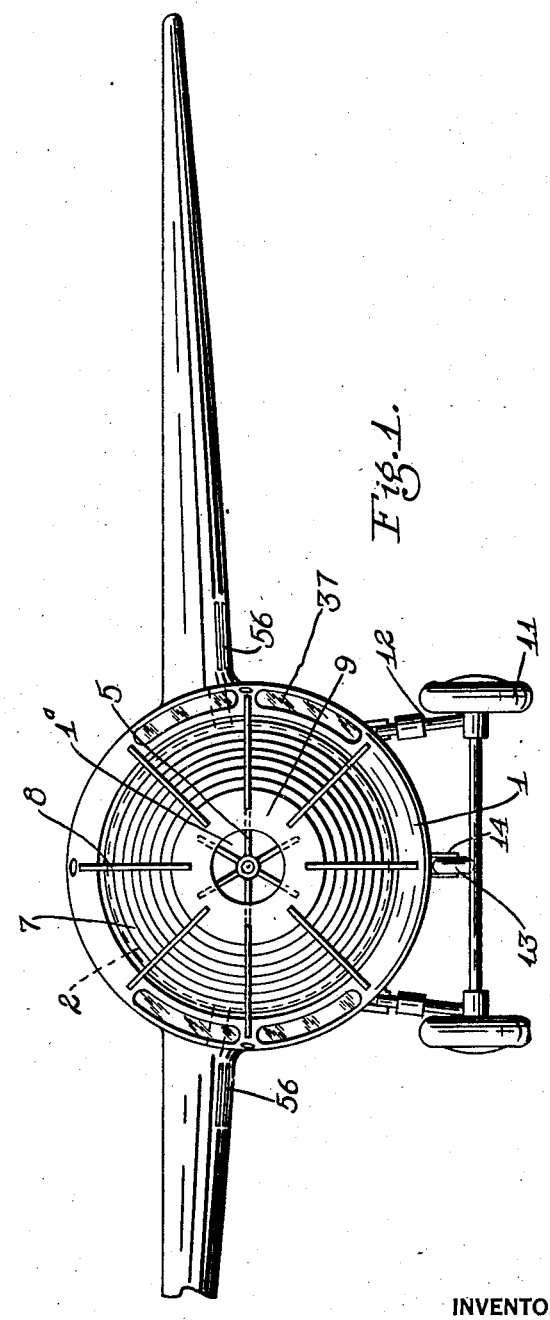

June 28, 1932.   C. F. JOHNSON   1,864,912
AIRCRAFT
Filed June 28, 1930   3 Sheets-Sheet 1

INVENTOR
CHARLES F. JOHNSON
BY
A. B. Bowman
ATTORNEY

June 28, 1932.  C. F. JOHNSON  1,864,912
AIRCRAFT
Filed June 28, 1930  3 Sheets-Sheet 2

INVENTOR
BY *Charles F. Johnson*
*A. B. Bowman*
ATTORNEY

June 28, 1932. C. F. JOHNSON 1,864,912
AIRCRAFT
Filed June 28, 1930 3 Sheets-Sheet 3

INVENTOR
CHARLES F. JOHNSON
BY A. B. Bowman
ATTORNEY

Patented June 28, 1932

1,864,912

UNITED STATES PATENT OFFICE

CHARLES F. JOHNSON, OF VENTURA, CALIFORNIA

AIRCRAFT

Application filed June 28, 1930. Serial No. 464,497.

My invention relates to aircraft, and more particularly to means for propelling aircraft, and new body construction of aircraft.

The objects of this invention are: first, to provide means for propelling aircraft forwardly, by means of which a partial vacuum is created at the nose of the body and a pressure at the rear end of the body, whereby the body is respectively drawn forwardly and pushed forwardly; second, to provide aircraft of this class having a hollow body provided with an air inlet opening in the middle portion of its nose through which air is drawn by a small and simple fan mechanism and directed radially behind the nose and backwardly, whereby other air is drawn through the nose around the middle opening for creating a partial vacuum over substantially the whole front end or nose of the body; third, to provide a body structure of this class for aircraft, whereby the air forced radially from the fan mechanism creates a pressure from the inside of the nose, and a vacuum at the forward end of the core or pilot and passenger body, whereby the outer shell or body is pushed forwardly and the core or pilot and passenger body is drawn forwardly by vacuum; forth, to provide aircraft of this class in which the air from the fan mechanism is forced backwardly through an annular constricted passage and then allowed to expand in a backwardly gradually increasing or diverging passage, whereby a pressure is created at the rear end of the body for pushing the body forwardly through the air; fifth, to provide a novelly constructed nose for the outer shell whereby air is efficiently drawn inwardly at the whole of the front end of the body; sixth, to provide a novelly constructed core or pilot and passenger body within an outer shell whereby a vacuum is created at the forward end thereof and a pressure at the rear portion; seventh, to provide novel means for supporting a tail and tail control surfaces on an aircraft body of this class, and also novel connections from the pilot body to the control surfaces; eighth, to provide novel means for ventilating the pilot and passenger body in an aircraft of this class; ninth, to provide a novel construction and arrangement of transparent panels whereby a large field of vision is afforded ahead and to the sides; tenth, to provide novel means of ingress and egress to and from an aircraft body of this class, and also novel means of closing the openings affording the ingress and egress; and, eleventh, to provide as a whole a novelly constructed aircraft and novel means of propelling the same, and one which is relatively simple and economical of construction and which will not readily deteriorate and get out of order.

Figure 2:
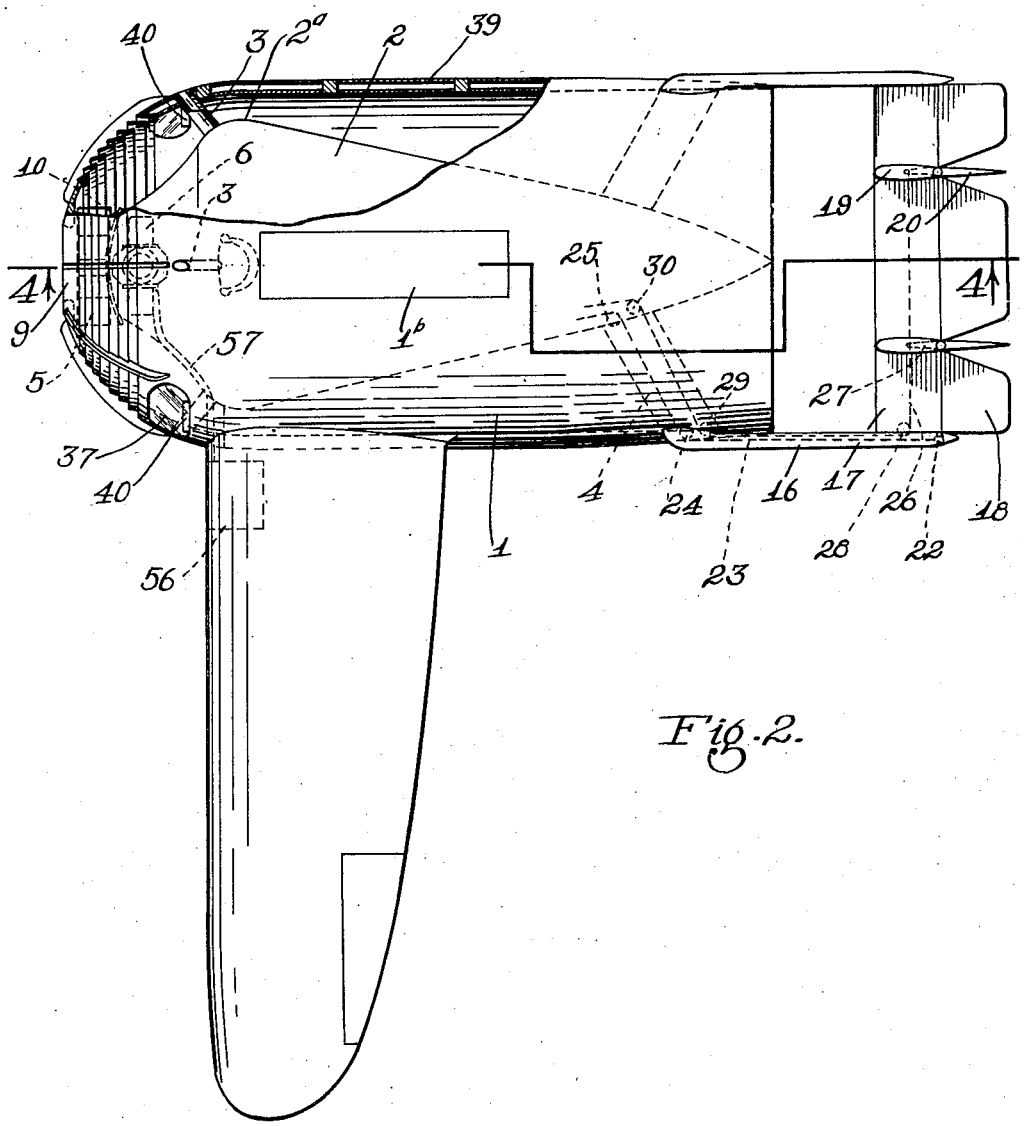
Figure 3:
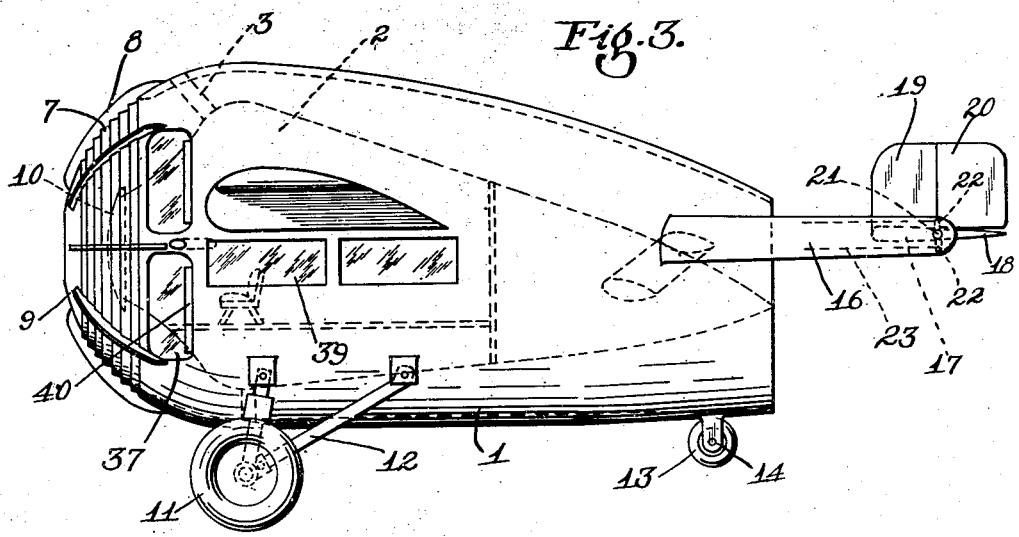
Figure 4:
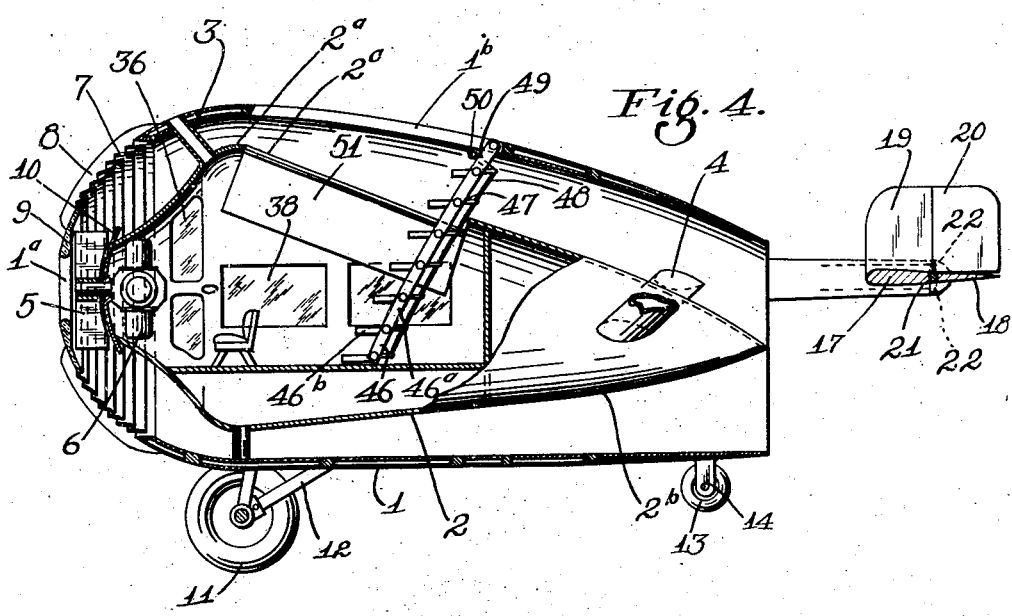

With these and other objects in view as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application, in which:

Fig. 1 is a fragmentary front view of a monoplane incorporating my invention in one form; Fig. 2 is a fragmentary plan view thereof, showing a portion broken away and in section to facilitate the illustration; Fig. 3 is a side elevational view thereof; and, Fig. 4 is a longitudinal sectional view taken substantially at 4—4 of Fig. 2.

Like characters of reference refer to similar parts and portions throughout the views of the drawings.

The new features of my aircraft are preferably embodied in the engine gondolas or enclosures, pilot or passenger bodies, of different kinds or types of aircraft, or in the fuselage of airplanes.

The fuselage of the airplane shown in the drawings consists primarily of an outer shell or body 1 and an inner body or core 2, the latter positioned substantially in alignment with the former, and both positioned with their longitudinal axes substantially in line with the direction of flight of the airplane. The inner body or core is here shown as a pilot and passenger body and is supported relative to the shell 1 by struts 3 at the forward portion of each, and by struts 4 at the rear portions of each.

The shell 1 is substantially cylindrical, except that the upper wall thereof is directed slightly downwardly toward the rear end, as shown in Figs. 3 and 4. The nose of the shell 1 is rounded and is provided at its central portion with an opening 1a for admitting air to the shell from the front end. In and on the nose or forward end of the core is rotatably mounted a fan 5 with its axis substantially in alignment with the longitudinal axis of the core. This fan is adapted to be rotated by a motor mounted in the front end, but preferably within, the core 2. The fan 5 is preferably a fan with flat blades or impellers for drawing air through the opening 1a and directing the air radially from the fan against the inner side of the nose of the shell 1. The round portion of the nose of the shell 1 is made up of a plurality of concentric radially spaced apart bands positioned respectively slightly behind the next inner band. These bands or annular members are so arranged relative to each other that the spaces between adjacent bands or annular members form annular passages which converge inwardly and are directed at their inner portions toward the side wall of the shell, thus forming substantially inwardly directed passages in the form of ejectors whereby air is drawn into the forward or front sides thereof by reason of vacuum created at the inner portion thereof when the air from the fan is forced past the inner openings of said passages. These bands or annular members are supported in spaced concentric relation relative to each other by spokes or ribs 8 which extend from the central annular member 9, in which the opening 1a is provided, radially backwardly at the front side of the nose toward the side wall of the shell. The forward portion of the core or pilot and passenger body 2 is depressed inwardly instead of being rounded as in the case of the nose of the shell 1. The inwardly depressed portion of the front end of the body 2 is depressed inwardly at the portion outside of the diameter of the fan, forming substantially a pocket inwardly from the stream of air directed toward the inner edges or portions of the bands 7, creating a partial vacuum against the forward end of the core and tending to force the same forwardly. This vacuum at the forward end of the core or body 2 is increased by the head end of the core or body 2 extending slightly over the front ends and radially beyond the front end of the depressed portion.

The portion of the body or core 2 is of its greatest diameter immediately behind said depressed portion and is positioned substantially at the juncture between the rounded nose and the side wall of the shell 1. The opening or space between this large portion of the core 2 and the inner wall of the shell 1 forms an annular constricted opening for the passage of the air backwardly. The core 2 is reduced from this enlarged portion 2a toward its rear end and converges gradually in substantially a cone shape to substantially a point at its rear end, as indicated by 2b. The rear end of the core 2 terminates at substantially the rear end of the shell 1. As the air passes the constricted passage between the core 2 and the shell 1, it is expanded and forced backwardly from the rear end of the shell 1, causing a forward propelling force upon the fuselage. The expansion of the air also causes a forward force against the backwardly converging walls of the core 2.

The fuselage described above is provided with the usual undercarriage at the lower side of its forward end. This undercarriage consists of wheels 11 mounted on an undercarriage frame 12 secured to the lower portion of the shell 1. There is no tail skid provided on the airplane shown, but the rear end of the fuselage is provided with a rear wheel 13 which is mounted on the rear end of the shell 1 and supported by the bracket 14.

The tail surfaces of the airplane are mounted at the rear ends of a pair of spaced apart supports 16 which extend backwardly from the shell 1 at the opposite sides thereof, as shown best in Figs. 2 and 3. The horizontal stabilizer, designated 17, is mounted on and extends between the supports 16, and the elevators, designated 18, are mounted at the rear edge of the horizontal stabilizer. In the structure illustrated, I have shown a pair of vertical stabilizers 19 which extend upwardly from the horizontal stabilizer in spaced relation. To the rear edges of the vertical stabilizers, are pivotally connected the rudders 20. The elevator is divided into three sections, one positioned between the rudders and the others outside, or laterally from, the rudders. The elevators may be all connected to a horizontal bar 21 which terminates in the supports 16 and are provided at the ends with arms 22 to which are connected cables or other members 23 which extend forwardly through the supports 16 over sheaves 24 through the struts 4, which are hollow, and around other sheaves 25, to the forward portion of the core or pilot and passenger body 2. The rudders are similarly operated by cables 26 which are connected to forwardly extending arms 27 positioned in the horizontal stabilizer and connected to the pivot rods upon which the rudders are mounted. The cables 26 also extend around sheaves 28, 29 and 30 from the horizontal stabilizer, the supports 16, the hollow struts 4, into the core or pilot and passenger body.

Vision to the front and the sides is afforded by a transparent shield 10, referred to above, immediately in front of the engine, whereby vision may be had through the opening 1a, and if desired the annular member 9, immediately surrounding the opening 1a, may be made transparent. Vision ahead may be also had through transparent panels 36 at the forward portion of the core and particularly in the depressed portion thereof. Vision may be had through these panels 36 through or between the spaced apart concentric bands 7. In the outer shell 1 are also provided transparent panels 37 through which vision may be had to the sides through the panels 36 in the core 2. In the side wall of the core 2 may be provided other transparent panels 38 which are positioned in registry with transparent side panels 39 in the outer shell 1. Through these transparent side panels general vision may be had to the sides of the aircraft by both the pilot and passengers.

If desired, mirrorscopes 40 may be located at the sides of the outer shell 1 and preferably at the inner side and rear portion of the transparent side panels 37, whereby a large field of vision may be had directly ahead and ahead and to the sides. If desired, the mirrorscopes may be convex either spherical or cylindrical so as to increase the field of vision.

Access may be had to the pilot and passenger body 2 through openings 1b and 2c at the upper sides of the shell 1 and body or core 2, said openings being in registry with each other. From the rear end of the opening or hatch 1b extends collapsible steps 46 which consists of runners 46a pivoted at their upper ends, and threads 46b which are pivoted at their inner edges on and between the runners 46a. The runners are shaped to conform with the shape or curvature of the shell 1, so that when the steps are raised about its pivotal axis at the upper end, the runners of the steps conform with the curvature of the shell 1 for closing the opening or hatch 1b when the aircraft is in flight. It will be noted that the treads are so mounted that they close the space between adjacent treads and thereby form an enclosing wall when the steps are raised into position over the opening 1b. The folding of the tread may be effected automatically by providing each of the treads with backwardly extending arms 47 which may be connected with each other by links 48 and the upper arms or arms of the upper tread connected to a pivotal arm 49 which is mounted on a bracket 50 at the inner side of the shell wall and slightly forwardly and downwardly from the pivotal axis of the steps. The opening or hatch 2c in the core 2 may be closed by a pivoted panel 51 conforming in contour with the wall of the core 2.

It will be here noted that if the core is used as a pilot and passenger compartment or body, ventilation may be supplied thereto through conductors from the front of the body. In this instance I have shown the front struts 3 as hollow and directed angularly forwardly and to the side, whereby air may be forced automatically into the interior of the core or body 2.

If the engine 6 is mounted at the forward end and interior of the core 2, the same is preferably water cooled, and the cooling water therefor may be cooled in radiators 56 mounted under each wing, as shown in Figs. 1 and 2. These radiators are connected with the engine by conductors 57, which may extend between the engine and the radiator or radiators in any convenient manner.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In an aircraft, a hollow body extending longitudinally with respect to the direction of flight of the aircraft, said body being open at its rear end and provided with a small opening in its nose, a core positioned within the hollow body and spaced with its forward end and side walls respectively behind the nose and inwardly from the side walls of the hollow body, and means at the forward end of the core and inwardly from the opening for drawing air through the opening and directing the same to the sides and backwardly between the hollow body and the core, there being provided in the nose of the core, there being provided in the nose of the hollow body outwardly from the opening therein a plurality of other openings converging inwardly from the forward end of the nose and directed at their inner portions toward the sides of the body.

2. In an aircraft, a hollow body extending longitudinally with respect to the direction of flight of the aircraft, said body being open at its rear end and provided with a small opening in its nose, a core positioned within the hollow body and spaced with its forward end and side walls respectively behind the nose and inwardly from the side walls of the hollow body, and means at the forward end of the core and inwardly from the opening for drawing air through the opening and directing the same to the sides and backwardly between the hollow body and the core, there being provided in the nose of the body around the central opening therein a plurality of ejector openings for drawing air through the nose by the flow of air to the sides of the body from said means.

3. In an aircraft, a hollow body extending longitudinally with respect to the direction of flight of the aircraft, said body being open at its rear end and provided with a small opening in its nose, a core positioned within the hollow body and spaced with its forward end and side walls respectively behind the nose and inwardly from the side walls of the hollow body, and means at the forward end of the core and inwardly from the opening for drawing air through the opening and directing the same to the sides and backwardly between the hollow body and the core, there being provided in the nose of the body a plurality of concentric arcuate openings outwardly from the central opening, said arcuate openings converging inwardly from the outer side of the nose and directed toward the sides of the body.

4. In an aircraft, a hollow body extending longitudinally with respect to the direction of flight of the aircraft, said body being open at its rear end and provided with a small opening in its nose, a core positioned within the hollow body and spaced with its forward end and side walls respectively behind the nose and inwardly from the side walls of the hollow body, and means at the forward end of the core and inwardly from the opening for drawing air through the opening and directing the same to the sides and backwardly between the hollow body and the core, the nose of the body comprising a plurality of annular concentric radially spaced apart bands converging relative to each other at their inner edges forming substantially inwardly converging passages from the outer side of the nose to the inside of the body, the converged inner portions of the passages being directed toward the sides of the body.

5. In an aircraft, a body positioned longitudinally with respect to the direction of flight of the aircraft, said body being hollow and provided with a rounded nose with an opening in the central portion of said nose, the rear end of the body being open, a core positioned longitudinally within the body and spaced with its forward end behind said opening and backwardly from the nose and also spaced with its side walls from the inner side walls of the body, and an impeller fan rotatably mounted on the forward end of the core on an axis substantially in alignment with the longitudinal axes of the core and the opening in the nose of the body for drawing in air through the opening in said nose and for directing the air radially behind the nose and backwardly between the body and the core, there being provided in the nose of the body a plurality of air inlet passages converging from the outer side of the nose to the inner side thereof and directed at the inner portion of the air inlet passages toward the side of the body for drawing air from the front side of the nose by the passage of air radially at the back side of the nose.

6. In an aircraft, a body positioned longitudinally with respect to the direction of flight of the aircraft, said body being hollow and provided with a rounded nose with an opening in the central portion of said nose, the rear end of the body being open, a core positioned longitudinally within the body and spaced with its forward end behind said opening and backwardly from the nose and also spaced with its side walls from the inner side walls of the body, and an impeller fan rotatably mounted on the forward end of the core on an axis substantially in alignment with the longitudinal axes of the core and the opening in the nose of the body for drawing in air through the opening in said nose and for directing the air radially behind the nose and backwardly between the body and the core, said nose of the body comprising a plurality of annular concentric radially spaced apart bands, said bands converging relative to each other at their inner portions and directed at said inner portions toward the sides of the body forming means for ejecting air from the front side of the nose into the body by the passage of air from the fan against the rear side of the nose.

7. In an aircraft, a body positioned longitudinally with respect to the direction of flight of the aircraft, said body being hollow and provided with a rounded nose with an opening in the central portion of said nose, the rear end of the body being open, a core positioned longitudinally within the body and spaced with its forward end behind said opening and backwardly from the nose and also spaced with its side walls from the inner side walls of the body, and an impeller fan rotatably mounted on the forward end of the core on an axis substantially in alignment with the longitudinal axes of the core and the opening in the nose of the body for drawing in air through the opening in said nose and for directing the air radially behind the nose and backwardly between the body and the core, said core converging substantially to a point at its rear end forming a diverging air space between the body and the core backwardly from the forward portion of the core.

8. In an aircraft, a hollow body having a round nose and an opening in the central portion of the nose, a core positioned longitudinally within the body and spaced with its forward end behind the opening and behind the nose and with its side walls inwardly from the inner wall of the body, a fan rotatably mounted on the forward end of the core on an axis substantially in alignment with the core and the opening, the nose of the body having a plurality of inwardly converging air passages around the central opening, said air passages converging inwardly and toward the sides of the body for drawing air inwardly from the front side of the nose by the radial passage of air from the fan against the inner side of the nose, the forward end of the core, radially outwardly from the fan, being curved inwardly.

9. In an air craft, a hollow body having a round nose and an opening in the central portion of the nose, a core positioned longitudinally within the body and spaced with its forward end behind the opening and behind the nose and with its side walls inwardly from the inner wall of the body, a fan rotatably mounted on the forward end of the core on an axis substantially in alignment with the core and the opening, the nose of the body having a plurality of inwardly converging air passages around the central opening, said air passages converging inwardly and toward the sides of the body for drawing air inwardly from the front side of the nose by the radial passage of air from the fan against the inner side of the nose, the forward end of the core, radially outwardly from the fan, being curved inwardly, the portions of the core immediately behind the inwardly curved portion thereof being positioned near the inner wall of the body forming an annular constriction, and the portion of the core backwardly from said constriction being backwardly converging forming a backwardly diverging annular space between the body and the core.

10. In an aircraft, a hollow shell extending longitudinally with respect to the direction of flight of the aircraft, said shell having air inlet means at its nose and provided with an opening at its rear end for discharging air, tail supports extending longitudinally backwardly from the shell at the opposite lateral sides, elevator and rudder means mounted on and between the rear ends of said supports, a hollow passenger body positioned within the shell and spaced with its forward end backwardly from the nose and with its sides inwardly from the inner side walls of the shell, struts supporting the forward and rear ends of the body relative to the shell, the struts at the rear end being hollow, and elevator and rudder control means within the body, said control means extending backwardly through the body, through the rear struts and through the supports and connected to the elevator and rudder means.

11. In an aircraft, a shell having means at its forward end for admitting air to the shell and means at its rear end for discharging the air, a pilot and passenger body mounted within the shell and spaced with its forward end backwardly from the forward end of the shell and with its side walls inwardly from the inner side walls of the shell, and propelling means at the forward end of the body for drawing air from the front of the shell and directing the air radially therefrom between the forward ends of the shell and body and backwardly between the same, the forward ends of the shell and body and the forward portions of the side walls of each having registering transparent panels whereby vision may be had forwardly and to the sides from the forward portion of the interior of the body.

12. In an aircraft, a shell having means at its forward end for admitting air to the shell and means at its rear end for discharging the air, a pilot and passenger body mounted within the shell and spaced with its forward end backwardly from the forward end of the shell and with its side walls inwardly from the inner side walls of the shell, and propelling means at the forward end of the body for drawing air from the front of the shell and directing the air radially therefrom between the forward ends of the shell and body and backwardly between the same, and struts supporting the forward and rear ends of the body in spaced relation relative to and within the shell, the struts at the forward end of the body being hollow and diverging forwardly and radially from the body for admitting air from the outside of the shell to the interior of the body.

13. In an aircraft, a shell having means at its forward end for admitting air to the shell and means at its rear end for discharging the air, a pilot and passenger body mounted within the shell and spaced with its forward end backwardly from the forward end of the shell and with its side walls inwardly from the inner side walls of the shell, and propelling means at the forward end of the body for drawing air from the front of the shell and directing the air radially therefrom between the forward ends of the shell and body and backwardly between the same, the body and shell having large openings in the upper walls of each for permitting ingress and egress to and from the body, said openings being in registry with each other, a panel for closing the upper opening of the body, and steps extending from the opening in the shell to the interior of the body through the opening in the upper side of the body.

14. In an aircraft, a shell having means at its forward end for admitting air to the shell and means at its rear end for discharging the air, a pilot and passenger body mounted within the shell and spaced with its forward end backwardly from the forward end of the shell and with its side walls inwardly from the inner side walls of the shell, and propelling means at the forward end of the body for drawing air from the front of the shell and directing the air radially therefrom between the forward ends of the shell and body and backwardly between the same, the body and shell having large openings in the upper walls of each for permitting ingress and egress to and from the body, said openings being in registry with each other, a panel for closing the upper opening of the body, a frame hinged to the shell at one end of the opening at the upper side thereof and extending downwardly into the interior of the body through the opening in the upper side of the body, said frame having treads forming steps from the upper side of the shell to the interior of the body, said frame being shiftable upwardly into the opening in the upper side of the shell and the treads thereon being collapsible backwardly for closing the spaces between the treads and the opening in the upper side of the shell.

In testimony whereof, I have hereunto set my hand at Los Angeles, California this 20th day of June 1930.

CHARLES F. JOHNSON.